United States Patent [19]

Oyama et al.

[11] Patent Number: 5,114,668

[45] Date of Patent: May 19, 1992

[54] GRID IN A NUCLEAR FUEL ASSEMBLY

[75] Inventors: Junichi Oyama; Kazuichi Suzuki; Akihiro Kato, all of Ibaraki; Hitoshi Inada, Kobe; Masaji Mori, Kobe; Hiromasa Miyai, Kobe; Toshiyuki Kawagoe, Tokyo, all of Japan

[73] Assignee: Mitsubishi Nuclear Fuel Co., Tokyo, Japan

[21] Appl. No.: 469,014

[22] Filed: Jan. 23, 1990

[30] Foreign Application Priority Data

Jan. 25, 1989 [JP] Japan ............................... 1-15986

[51] Int. Cl.$^5$ ................................................ G21C 3/34
[52] U.S. Cl. ..................................................... 376/442
[58] Field of Search ........................ 376/442, 441, 462

[56] References Cited

U.S. PATENT DOCUMENTS

| 3,920,515 | 11/1975 | Ferrari et al. | 376/442 |
| 4,028,180 | 6/1977 | Finch | 376/442 |
| 4,165,256 | 8/1979 | Jabsen | 376/442 |
| 4,224,107 | 9/1980 | Delafosse et al. | 376/442 |

FOREIGN PATENT DOCUMENTS

| 0196598 | 10/1986 | European Pat. Off. . |
| 2827927 | 1/1979 | Fed. Rep. of Germany . |
| 3407163 | 10/1984 | Fed. Rep. of Germany . |
| 3802848 | 8/1988 | Fed. Rep. of Germany . |
| 2200587 | 4/1974 | France . |
| 2303352 | 10/1976 | France . |
| 53-1788 | 1/1978 | Japan . |
| 54-87384 | 7/1979 | Japan . |

*Primary Examiner*—Daniel D. Wasil
*Attorney, Agent, or Firm*—Oblon, Spivak, McClelland, Maier & Neustadt

[57] ABSTRACT

In a grid in a nuclear fuel assembly for supporting fuel rods, elongated straps intersect with each other to define grid cells. At least one pair of punched sections are formed, in spaced relation to each other, in each of peripheral walls of the respective grid cells. At least one of elongated spring elements is formed in the peripheral wall of each grid cell. Each spring element is formed such that a portion of the peripheral wall of the grid cell between the pair of punched sections bulges and projects into the grid cell. The spring element is capable of being deflected toward the peripheral wall of the grid cell. A pair of projections are formed in the peripheral wall of the grid cell respectively at both longitudinal ends of the spring element such that a pair of portions of the peripheral wall of the grid cell bulge. Both longitudinal ends of the spring element are connected respectively to the pair of projections.

9 Claims, 2 Drawing Sheets

GRID IN A NUCLEAR FUEL ASSEMBLY

BACKGROUND OF THE INVENTION

1. Field of the Invention

The present invention relates to a grid in a fuel assembly for supporting a plurality of fuel rods and, more particularly, to an improvement in spring elements which are urged against the fuel rods to support the same.

2. Prior Art

A fuel assembly, which is mounted to a nuclear reactor, is formed such that a plurality of elongated fuel rods each having sealed thereto a plurality of cylindrical fuel pellets are arranged in spaced parallel relation to each other through a predetermined spacing. A plurality of grids are used as means for arranging the fuel rods in the above positional relationship.

As shown in FIGS. 5 through 7 of the attached drawings, the aforesaid grid comprises a plurality of elongated straps 1 each in the form of a thin plate. A plurality of slits 2 formed in the straps 1 in equidistantly spaced relation to each other longitudinally along each of the straps 1 are fitted into each other such that the straps 1 intersect with each other in the form of a lattice to define therein a number of grid cells 3 each having a peripheral wall formed by wall sections of the respective four straps 1.

Pairs of dimples 5 and a spring element 6 for supporting a corresponding one of a plurality of fuel rods 4 are formed on the peripheral wall of a corresponding one of the grid cells 3 in facing relation to each other. The fuel rod 4 is urged against the dimples 5 by the spring elements 6 so that the fuel rod 4 is supported therebetween. Each of the spring elements 6 is formed as follows. That is, a pair of portions of the peripheral wall of the grid cell 3, which are located respectively at both lateral sides of an elongated portion of the strap 1 serving as the spring element 6, are punched to form a pair of punched sections 7 and 7. The elongated portion of the strap 1, which remains at the center between the pair of punched sections 7 and 7, bulges in a stepwise manner. The elongated bulging portion of the strap 1 has a planar section 6a which is in pressure contact with the fuel rod 4.

The spring element 6 constructed as above has its spring characteristics, that is, a deflection-load curve as shown in FIG. 8. In the spring element 6, within a range indicated by A, that is, within a range in which, even if the amount of deflection varies, the load is constant, the spring element 6 urges the fuel rod 4 against the dimples 5. Accordingly, in the grid formed with such spring elements 6, even if slight variation occurs in positions of the respective spring elements 6 during assembly of the grid, the variation is absorbed to clamp the fuel rod 4 with constant load.

In the grid constructed as above, however, when the fuel rod 4 is inserted into the grid cell 3, an outer peripheral surface of the fuel rod 4 slides against the spring elements 6 and the dimples 5. Accordingly, there is reason for concern that scratches will be generated axially on the outer peripheral surface of the fuel rod 4. In order to completely prevent generation of such scratches, the following countermeasure is taken. That is, external force is applied to the spring elements 6 to deflect the same such that the spring elements 6 are not in contact with the fuel rod 4. Subsequently, the fuel rod 4 is inserted into the grid cell. The external force is then relieved to urge the spring elements 6 against the fuel rod 4. When the external force is applied to the spring element 6 to deflect the same such that an amount of deflection thereof reaches a value equal to or above a predetermined value, however, the spring element 6 partially begins to reach its plastic range. The spring element 6 at the time the external force is relieved returns as indicated by the broken line in FIG. 8. Thus, the spring characteristics of the spring element 6 varies.

In view of the above, there has been provided a grid shown in FIGS. 9 and 10 in which, each of a plurality of spring elements 18 is formed such that, even if the spring element 18 is deflected as described above, the spring element 18 is deflected within an elastic range so that its spring characteristics do not vary.

The above grid is formed as follows. That is, each of a plurality of straps 11 has a wall whose pair of portions located respectively at both lateral sides of an elongated portion of the peripheral wall, which is to serve as the spring element 18, are punched to form a pair of punched sections 19. The elongated portion of the wall of the strap 11, which remains at the center between the pair of punched sections 19, bulges in the form of a triangle in cross-section, and a convex section 18a, which is to be held in pressure contact with the fuel rod 4, is formed at its apex portion.

The spring element 18 has the spring characteristics shown in FIG. 11. That is, the load increases linearly, accompanied with an increase in an amount of deflection and, further, the spring element 18 is deflected within an elastic range. Accordingly, the grid having the spring elements 18 constructed as above has such an advantage that, even if the spring element 18 is deflected so as not to be in contact with the fuel rod, the spring characteristics of the spring element 18 do not vary.

In the spring element 18, however, a range does not exist in which, even if the amount of deflection varies, the load is constant. Accordingly, because of variation during assembly of the grid, the amounts of deflection of the respective spring elements 18 are different from each other. Thus, it is difficult to clamp the fuel rod 4 with a constant load.

Moreover, when the spring element 18 is deflected, it tends to slide axially as illustrated in FIG. 12. For this reason, there is also such a disadvantage that it is difficult to maintain the height of the spring element 18 from the wall surface of the strap 11 under such a condition as assembling of the grid.

SUMMARY OF THE INVENTION

It is therefore an object of the invention to provide a grid in a nuclear fuel assembly, which comprises a plurality of elongated spring means in which permanent deformation does not readily occur, and in which variation in the spring characteristics does not occur during assembly or use, so that stable spring force can be obtained.

For the above purpose, according to the invention, there is provided a grid in a nuclear fuel assembly for supporting a plurality of fuel rods, comprising:

a plurality of elongated straps intersecting with each other to define a plurality of grid cells each having a peripheral wall, the peripheral walls of the grid cells having a plurality of pairs of punched sections formed therein such that each pair of punched sections are disposed in spaced relation to each other;

a plurality of elongated spring means each formed in the peripheral wall of the grid cell, the spring means being formed such that a portion of the peripheral wall of the grid cell between the pair of punched sections bulges and projects into the grid cell, the spring means being capable of being deflected toward the peripheral wall of the grid cell; and a plurality of pairs of projections associated respectively with the plurality of elongated spring means, each pair of projections being formed on the peripheral wall of the grid cell at both longitudinal ends of a corresponding one of the plurality of elongated spring means such that a pair of portions of the peripheral wall of the grid cell bulge, which pair of portions are located respectively at the both longitudinal ends of the spring means, the both longitudinal ends of the spring means being connected respectively to the pair of projections.

According to the grid of the invention, a connecting section between each of the pair of projections and a corresponding one of the plurality of elongated spring means is formed as follows. That is, the connecting section is deflected in an inclined manner such that the connecting portion moves rotatably toward a wall surface of the strap means is deflected so as to approach the wall surface of the strap. By bending rigidity due to the spring means and rotational rigidity due to the projection, a range, in which, even if the amount of deflection varies, the load is constant, is caused to exist in the spring characteristics of the spring means. Moreover, the spring means has such a configuration that local stress concentration is limited as compared with the conventional spring element illustrated in FIG. 5. Thus, the spring means is deflected substantially within an elastic range.

Accordingly, if the spring means urges the fuel rod within the range in which, even if the amount of deflection varies, the load is constant, the following advantage is obtained. That is, even if slight variation occurs in positions of the respective spring means during assembly of the grid so that the amount of deflection of the spring means varies slightly, it is possible to urge the fuel rod with a constant load to clamp the same.

Furthermore, if excessive displacement is applied to the spring means to deflect the same, plastic deformation of the spring means is limited because the local stress concentration is reduced as compared with the conventional spring element illustrated in FIG. 5. Accordingly, there is almost no variation in the spring characteristics.

Preferably, the above grid further comprises a plurality of pairs of ribs associated respectively with the grid cells such that each pair of the plurality of ribs are formed respectively at both lateral sides of a corresponding one of the plurality of elongated spring means. The pair of ribs project respectively into a corresponding pair of the plurality of pairs of punched sections. The pair of ribs extend between both the longitudinal ends of the spring means.

With the above arrangement, when the spring means is deflected toward the wall surface of the strap, two pairs of ribs provided respectively at the both lateral sides of the spring means prevent a spacing between both the longitudinal ends of the spring means from being extended so that the spring means slides longitudinally thereof. Thus, a height of the spring means from the wall surface of the strap under such a condition as assembling of the grid can be maintained constant. This makes it possible to prevent the spring means from being deformed at assembling.

DESCRIPTION OF THE PREFERRED EMBODIMENTS OF THE INVENTION

Figure 1:
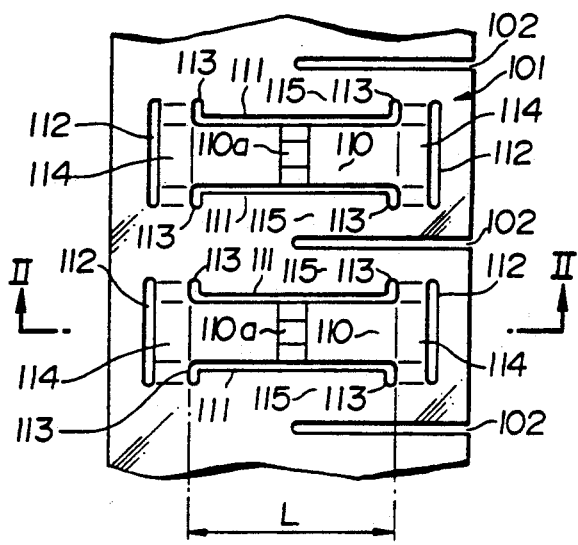
FIG. 1 is a fragmented side elevational view of one of a plurality of straps which form a grid according to an embodiment of the invention.
Figure 2:
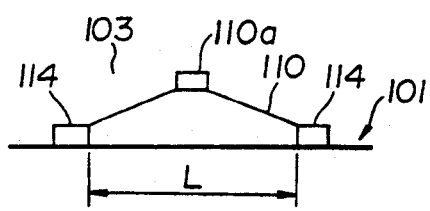
FIG. 2 is a schematic cross-sectional view taken along the line II—II in FIG. 1.
Figure 5:
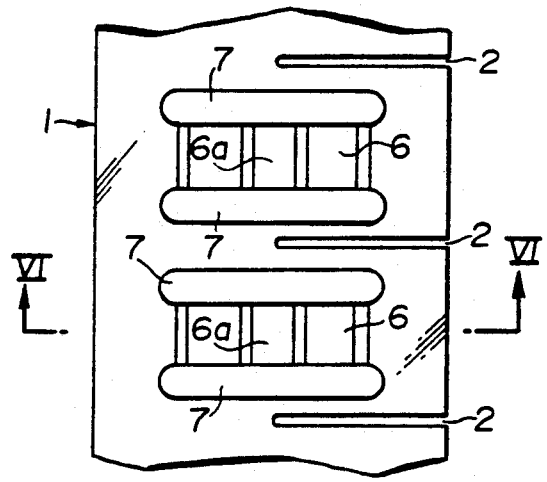
FIG. 5 is a fragmented side elevational view of one of a plurality of straps which form the conventional grid.
Figure 7:
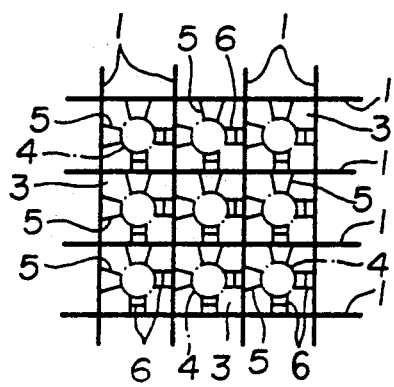
FIG. 7 is fragmented top plan view of the grid formed by the straps, one of which is illustrated in FIG. 5.
Figure 10:
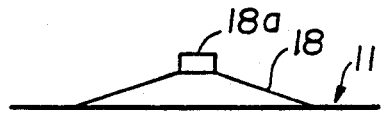
FIG. 10 is a cross-sectional view taken along the line X—X in FIG. 9.
Figure 8:
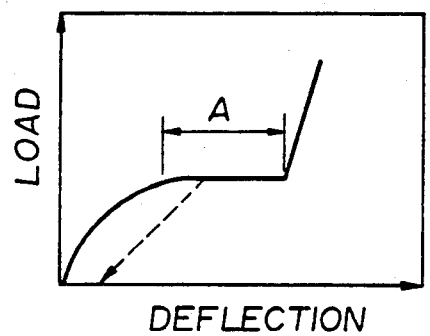
FIG. 8 is a graphical representation of the spring characteristics of the spring elements illustrated in FIGS. 5 through 7
Figure 11:
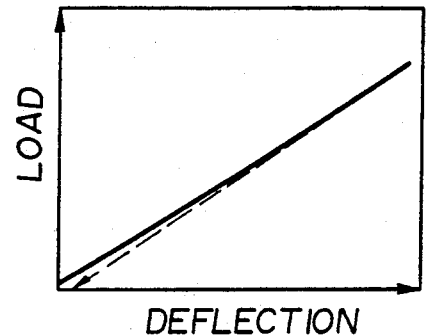
FIG. 11 is a graphical representation of the spring characteristics of the spring elements illustrated in FIGS. 9 and 10.
Figure 9:
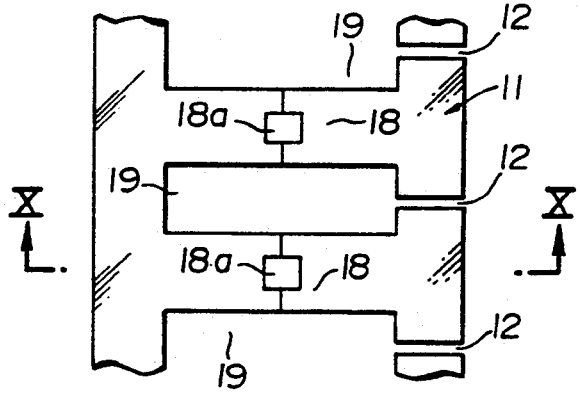
FIG. 9 is a fragmented side elevational view of one of the plurality of straps which form another conventional grid.
Figure 12:
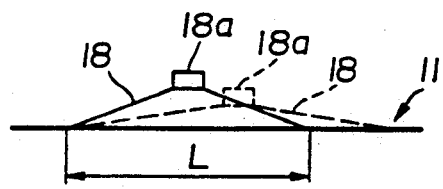
FIG. 12 is a view similar to FIG. 10, but showing a deformed condition of the spring elements illustrated in FIGS. 9 and 10.

Referring to FIGS. 1 and 2, there is shown, in a fragmented enlarged view, one of a plurality of elongated straps 101 each in the form of a thin strip, which form a grid in a nuclear fuel assembly like the grid illustrated in FIG. 7. The straps 101 are formed therein with slits 102 and intersect with each other to define a plurality of grid cells 103. In this connection, the grid in the nuclear fuel assembly is similar in construction to that described previously with reference to FIG. 7, and the description of the grid will therefore be omitted to avoid duplication.

Referring again to FIGS. 1 and 2, the strap 101 is formed with a plurality of elongated spring elements 110 which are arranged in equidistantly spaced relation to each other longitudinally along the strap 101. Each of the spring elements 110 is formed as follows. That is, a pair of portions of the strap 101 located respectively at both lateral sides of an elongated portion thereof, which is to serve as the spring element 110, are punched to form a pair of punched sections 111 and 111. The elongated portion, which remains at the center between the pair of punched sections 111 and 111, bulges in the form of an almost triangle in cross-section as shown in FIG. 2. Thus, the spring element 110 is formed. The spring element 110 in the form of a triangle in cross-section has an apex which is formed with a convex section 110a for urging a fuel rod corresponding to the fuel rod 4 illustrated in FIG. 7.

A plurality of pairs of punched sections 112 are associated respectively with the spring elements 110. Each pair of punched sections 112 extend straight perpendicularly to the pair of punched sections 111. The pair of punched sections 112 are formed respectively at a predetermined distance from the both longitudinal ends of the spring element 110. Each of the pair of punched sections 112 has a size longer than the spacing between the pair of punched sections 111.

A plurality of pairs of punched sections 113 are provided in the strap 101. Two pairs of punched sections 113 are associated respectively with the pair of punched sections 111. Each pair of punched sections 113 are formed respectively at both longitudinal ends of the punched section 111 so as to project from the latter away from the spring element 110.

A plurality of pairs of projections 114 are associated respectively with the spring elements 110. Each pair of projections 114 are formed in the peripheral wall of the grid cell 103 respectively at both longitudinal ends of the spring element 110 such that a pair of portions of the peripheral wall of the grid cell 103 bulge, which pair of portions are located respectively at both longitudinal ends of the spring element 110. Both longitudinal ends of the spring element 110 are connected respectively to the pair of projections 114. In other words, each of the pair of projections 114 is formed between a corresponding one of the pair of punched sections 113 and a corresponding one of the pair of punched sections 112. The pair of projections 114 are trapezoidal in shape in cross-section.

A plurality of pairs of ribs 115 are associated respectively with the grid cells 103 such that each pair of ribs 115 are formed respectively at both lateral sides of a corresponding one of the spring elements 110. The pair of ribs 115 project respectively into a corresponding pair of punched sections 111. The pair of ribs 115 extend between both longitudinal ends of the spring element 110. In other words, by formation of the pair of punched sections 113, the pair of ribs 115 are formed respectively at the both lateral sides of the spring element 110 so as to extend longitudinally thereof. By the pair of ribs 115, when the spring element 110 is deflected toward the wall surface of the strap 101, a spacing L between both longitudinal ends of the spring element 110 is extended to prevent the spring element 110 from sliding axially or longitudinally thereof.

Figure 3:
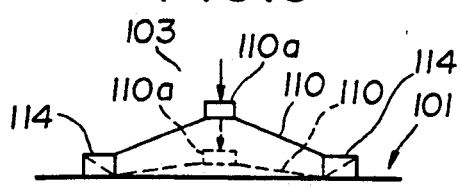
FIG. 3 is a view similar to FIG. 2, but showing a deformed condition of a spring element illustrated in FIGS. 1 and 2.
Figure 6:
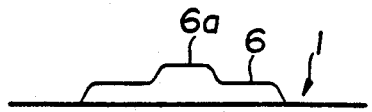
FIG. 6 is a cross-sectional view taken along the line VI—VI in FIG. 5.

When excessive displacement is applied to the convex section 110a of the spring element 110 constructed as above to deflect the same toward the wall surface of the strap 101, the spring element 110 is deflected into a configuration as indicated by the broken line in FIG. 3. Specifically, an inward edge of each of the pair of projections 114 and 114, that is, a connecting portion between the projection 114 and the spring element 110 is deflected so as to move rotatably toward the wall surface of the strap 101 about an outward edge of the projection 114. The spring element 110 is also deflected toward the wall surface of the strap 101.

Figure 4:
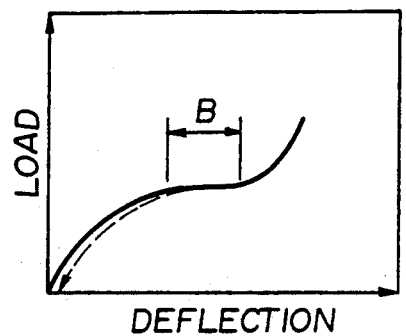
FIG. 4 is a graphical representation of the spring characteristics of the spring element illustrated in FIG. 3.

The spring characteristics of the spring element 110 is such that, as shown in FIG. 4, a range B exists in which, even if the amount of deflection varies, the load is constant. Furthermore, even if excessive displacement is applied to the spring element 110 to deflect the same so as not to be in contact with the fuel rod, the deflection is performed substantially within an elastic range. Thus, the spring element 110 returns when the excessive displacement is released, as indicated by the broken line in FIG. 4, so that there is almost no change or variation in the spring characteristic of the spring element 110.

Accordingly, if the spring element 110 is in pressure contact with the fuel rod within the range B in which, even if the amount of deflection varies, the load is constant, the following advantage is obtained. That is, even if slight variation occurs in positions of the respective spring elements 110 during assembly of the grid, the variation can be absorbed. Thus, it is possible to urge the fuel rod with a constant load to clamp the same.

Furthermore, each pair of ribs 115 are formed respectively at both lateral sides of a corresponding one of the spring elements 110. By the pair of ribs 115, when the spring element 110 is deflected toward the wall surface of the strap 101, the spacing L between the both longitudinal ends of the spring element 110 is extended to prevent the spring element 110 from sliding axially or longitudinally thereof. Thus, the height of the spring element 110 from the wall surface of the strap 1 under such a condition as assembling of the grid can be maintained constant.

What is claimed is:

1. A grid in a nuclear fuel assembly for supporting a plurality of fuel rods, comprising:
    a plurality of elongated straps intersecting with each other to define a plurality of grid cells each having a peripheral wall, the peripheral walls of said grid cells having a plurality of pairs of punched sections formed therein such that each pair of punched sections are disposed in spaced relation to each other;
    a plurality of elongated spring means each formed in the peripheral wall of said grid cell, the spring means being formed such that a portion of the peripheral wall of the grid cell between the pair of punched sections bulges and projects into the grid cell, the spring means being capable of being deflected toward the peripheral wall of the grid cell;
    a plurality of pairs of projections associated respectively with said plurality of elongated spring means, each pair of projections being formed on the peripheral wall of said grid cell at both longitudinal ends of a corresponding one of said plurality of elongated spring means such that a pair of portions of the peripheral wall of the grid cell bulge, which pair of portions are located respectively at the both longitudinal ends of the spring means, the both longitudinal ends of the spring means being connected respectively to the pair of projections; and
    a plurality of pairs of ribs associated respectively with said grid cells such that each pair of said plurality of ribs are formed respectively at both lateral sides of a corresponding one of said plurality of elongated spring means, the pair of ribs projecting respectively into a corresponding pair of said plurality of pairs of punched sections, and the pair of ribs extending between both longitudinal ends of the spring means.

2. A grid according to claim 1, wherein the portion between the pair of punched sections bulges in the form of an almost triangle in cross-section.

3. A grid according to claim 1, wherein each of said plurality of elongated spring means has an apex which is formed with a convex section.

4. A grid according to claim 1, further comprising a plurality of second pairs of punched sections associated respectively with said plurality of elongated spring means, each pair of said plurality of second pairs of punched sections extending perpendicularly to a corresponding pair of the first-mentioned plurality of pairs of punched sections, the second pair of punched sections being formed respectively at a predetermined distance from both longitudinal ends of a corresponding one of said plurality of elongated spring means.

5. A grid according to claim 4, wherein each of the second pair of punched sections has a size longer than a spacing between the first-mentioned pair of punched sections.

6. A grid according to claim 1, further comprising a plurality of third pairs of punched sections, two pairs of said plurality of third pairs of punched sections being associated respectively with a corresponding pair of said plurality of pairs of punched sections, each third pair of punched sections being formed respectively at both longitudinal ends of the punched section so as to project from the latter away from a corresponding one of said plurality of elongated spring means.

7. A grid according to claim 1, wherein said plurality of pairs of projections are trapezoidal in shape in cross-section.

8. A grid according to claim 1, wherein two of said elongated spring means are associated with each of said grid cells, and further comprising a plurality of pairs of dimples formed on the peripheral wall of a respective one of said grid cells such that each pair of dimples are disposed in facing relation to a respective one of said two elongated spring means.

9. A grid in a nuclear fuel assembly for supporting a plurality of fuel rods, comprising:
a plurality of elongated straps intersecting with each other to define a plurality of grid cells each having a peripheral wall, the peripheral walls of said grid cells having a plurality of pairs of punched sections disposed in spaced relation to each other; and
a plurality of elongated spring means each formed in the peripheral wall of said grid cell such that a portion of the peripheral wall of the grid cell between the pair of punched sections bulges and projects into the grid cell, the spring means being capable of being deflected toward the peripheral wall of the grid cell, and both longitudinal ends of each spring means are formed to bulge and project into the grid cell to define a pair of projections each of which is continuously connected with the spring means and extends in a direction perpendicular to the longitudinal direction of the spring means.

* * * * *